US011982425B2

(12) United States Patent
Rasmussen

(10) Patent No.: US 11,982,425 B2
(45) Date of Patent: May 14, 2024

(54) LIGHTING FIXTURE WITH AN XY BEAM MANIPULATING SYSTEM

(71) Applicant: HARMAN PROFESSIONAL DENMARK APS, Aarhus N (DK)

(72) Inventor: Niels Jørgen Rasmussen, Egga (DK)

(73) Assignee: Harman Professional Denmark Aps, Aarhus N (DK)

( * ) Notice: Subject to any disclaimer, the term of this patent is extended or adjusted under 35 U.S.C. 154(b) by 0 days.

(21) Appl. No.: 18/310,480

(22) Filed: May 1, 2023

(65) Prior Publication Data

US 2023/0349535 A1 Nov. 2, 2023

(30) Foreign Application Priority Data

May 2, 2022 (EP) .................................... 22171181

(51) Int. Cl.

*F21V 14/06* (2006.01)
*F21V 5/04* (2006.01)
*F21Y 115/10* (2016.01)

(52) U.S. Cl.

CPC ................ *F21V 14/06* (2013.01); *F21V 5/04* (2013.01); *F21Y 2115/10* (2016.08)

(58) Field of Classification Search

CPC .................................. F21V 14/06; F21V 5/04
See application file for complete search history.

(56) References Cited

U.S. PATENT DOCUMENTS

| | | | | |
|---|---|---|---|---|
| 5,915,829 | A | 6/1999 | Kalze et al. | |
| 11,149,922 | B1 * | 10/2021 | Reyes | F21V 14/08 |
| 2013/0039075 | A1 * | 2/2013 | Dalsgaard | F21V 11/183 362/321 |
| 2013/0120984 | A1 * | 5/2013 | Hinrichs | F21V 21/15 362/235 |
| 2013/0208479 | A1 * | 8/2013 | Allan | F21V 5/00 362/326 |
| 2013/0294080 | A1 | 11/2013 | Hansen | |
| 2013/0343057 | A1 * | 12/2013 | Quadri | F21V 13/04 362/268 |
| 2015/0109797 | A1 | 4/2015 | Pavel et al. | |
| 2017/0074490 | A1 * | 3/2017 | Destain | F21V 5/008 |
| 2020/0124253 | A1 * | 4/2020 | Lee | F21V 17/12 |
| 2021/0263398 | A1 * | 8/2021 | Latteo | G02B 19/0014 |

FOREIGN PATENT DOCUMENTS

| | | | |
|---|---|---|---|
| EP | 3557126 | A1 | 10/2019 |
| WO | 2011132108 | A1 | 10/2011 |
| WO | 2014195383 | A1 | 12/2014 |

* cited by examiner

*Primary Examiner* — Christopher E Dunay
(74) *Attorney, Agent, or Firm* — Artegis Law Group, LLP

(57) ABSTRACT

A lighting fixture comprising a light source, an exit lens and an XY beam manipulating system is disclosed. The XY beam manipulating system is arranged along an optical axis of the lighting fixture between the light source and an outer surface of the exit lens. The XY beam manipulating system is configured to perform movements within a plane and with two degrees of freedom, thereby causing an exiting light beam of the lighting fixture to move in accordance with a selected movement pattern.

15 Claims, 15 Drawing Sheets

LIGHTING FIXTURE WITH AN XY BEAM MANIPULATING SYSTEM

CROSS-REFERENCE TO RELATED APPLICATIONS

This application claims priority to the European Patent Application titled "A LIGHTING FIXTURE WITH AN XY BEAM MANIPULATING SYSTEM," filed on May 2, 2022, and having application number 22171181.5. The subject matter of this related application is hereby incorporated herein by reference.

FIELD OF THE INVENTION

The present disclosure relates to a lighting fixture, such as a moving head. The lighting fixture according to the disclosure comprises an XY beam manipulating system for creating optical projection effects.

BACKGROUND OF THE INVENTION

It is sometimes desirable to create optical projection effects, such as shapes, stationary patterns or moving patterns. Various approaches have previously been applied to obtain this.

Gobo projection systems, in which a gobo performs rotating movements, have been known for several years. In these systems, the possible movements of the optical projection effects are limited to rotational movements. Furthermore, the possible moving speed is limited.

Animation systems and framing systems have also been applied for creating optical projection effects. Contrary to the gobo projection systems, these systems rely on rotational movements as well as linear movements, thereby allowing for a wider selection of possible movement patterns of the optical projection effects. However, for these systems the possible moving speed is also limited.

Finally, a laser-based system may be applied for creating optical projection effects. In these systems, a mirror is typically moved with two or three degrees of freedom, e.g., tilted about two or three axes, thereby moving the projection of a beam emitted from a laser. This allows for essentially unlimited movement patterns of the optical projection effects. However, this requires dedicated equipment, and it is therefore a costly solution. Furthermore, lasers have many safety restrictions, i.e., may not be pointed towards humans.

SUMMARY

It is an object of embodiments of the disclosure to provide a lighting fixture with the capability of a creating optical projection effects in a cost-effective manner.

It is a further object of embodiments of the disclosure to provide a method for controlling a lighting fixture in order to create optical projection effects in a cost-effective manner.

According to a first aspect the disclosure provides a lighting fixture comprising a light source, an exit lens and an XY beam manipulating system, the XY beam manipulating system being arranged along an optical axis of the lighting fixture between the light source and an outer surface of the exit lens, wherein the XY beam manipulating system is configured to perform movements within a plane/planar surface and with two degrees of freedom, thereby causing an exiting light beam of the lighting fixture to move in accordance with a selected movement pattern. Accordingly, a planar movement is obtained for the XY beam manipulating system.

Thus, according to the first aspect, the disclosure provides a lighting fixture, e.g., in the form of a moving head. The lighting fixture comprises a light source and an exit lens. Accordingly, light generated by the light source travels through the lighting fixture and exits the lighting fixture via the exit lens. The path of the light through the lighting fixture defines an optical axis of the lighting fixture.

The lighting fixture further comprises an XY beam manipulating system. The XY beam manipulating system is arranged along the optical axis of the lighting fixture between the light source and an outer surface of the exit lens. In the present context the term 'XY beam manipulating system' should be interpreted to mean a system which is capable of manipulating a light beam by means of translational movements within a two-dimensional plane. Accordingly, the light beam generated by the light source can be manipulated by means of the XY beam manipulating system before it exits the lighting fixture via the exit lens. Thereby the projection of the light beam is also manipulated.

The XY beam manipulating system is configured to perform movements within a plane and with two degrees of freedom. Since the XY beam manipulating system performs movements within a plane, it takes up limited space, and thereby it is possible to accommodate it within a lighting fixture which also comprises other parts and is capable of performing other lighting tasks, without resulting in a bulky lighting fixture. This also allows the capability of creating optical projection effects in a cost-effective manner.

Since the XY beam manipulating system performs movements with two degrees of freedom within a planar surface, it is possible to create a wide selection of movement patterns for the optical projection effects.

Thus, a flexible system for creating optical projection effects is provided in a cost-effective manner, and without the need for dedicated equipment.

According to a second aspect, the disclosure provides a method for controlling a lighting fixture according to the first aspect of the disclosure, the method comprising the steps of:

- selecting a desired movement pattern for a light beam exiting the exit lens,
- obtaining at least one transfer function between the selected movement pattern and input parameters for the XY beam manipulating system,
- generating input parameters for the XY beam manipulating system, based on the at least one transfer function, and
- operating the XY beam manipulating system in accordance with the generated input parameters.

In the method according to the second aspect of the disclosure, a lighting fixture as described above is controlled. Accordingly, a person skilled in the art would readily understand that any feature described in combination with the first aspect of the disclosure could also be combined with the second aspect of the disclosure, and vice versa. In particular, any remarks set forth above are equally applicable here.

According to the method, a desired movement pattern for a light beam exiting the exit lens, and thereby the lighting fixture, is initially selected. Thus, it is selected which optical projection effect it is desired to create, and a movement pattern which provides this is selected. The movement pattern may, e.g., be selected among a number of predefined movement patterns. As an alternative, a movement pattern which has not been previously defined may be designed and selected.

Next, at least one transfer function between the selected movement pattern and input parameters of the XY beam manipulating system is obtained. The obtained transfer function provides a correspondence between the selected movement pattern and the input parameters of the XY beam manipulating system. Thus, by applying the selected movement pattern to the transfer function, input parameters for the XY beam manipulating system are obtained, which will cause the XY beam manipulating system to perform movements within a plane, in such a manner that the light beam exiting the lighting fixture moves in accordance with the selected movement pattern.

Accordingly, input parameters for the XY beam manipulating system are generated, based on the at least one transfer function, and the XY beam manipulating system is then operated in accordance with the generated input parameters. As described above, this will cause the exiting light beam to move in accordance with the selected movement pattern, and thereby the desired optical projection effect is created. As described above with reference to the first aspect of the disclosure, this is obtained in an easy and cost effective manner, and without requiring a bulky lighting fixture.

BRIEF DESCRIPTION OF THE DRAWINGS

The embodiments will now be described in further detail with reference to the accompanying drawings in which.

DETAILED DESCRIPTION

Figure 1:
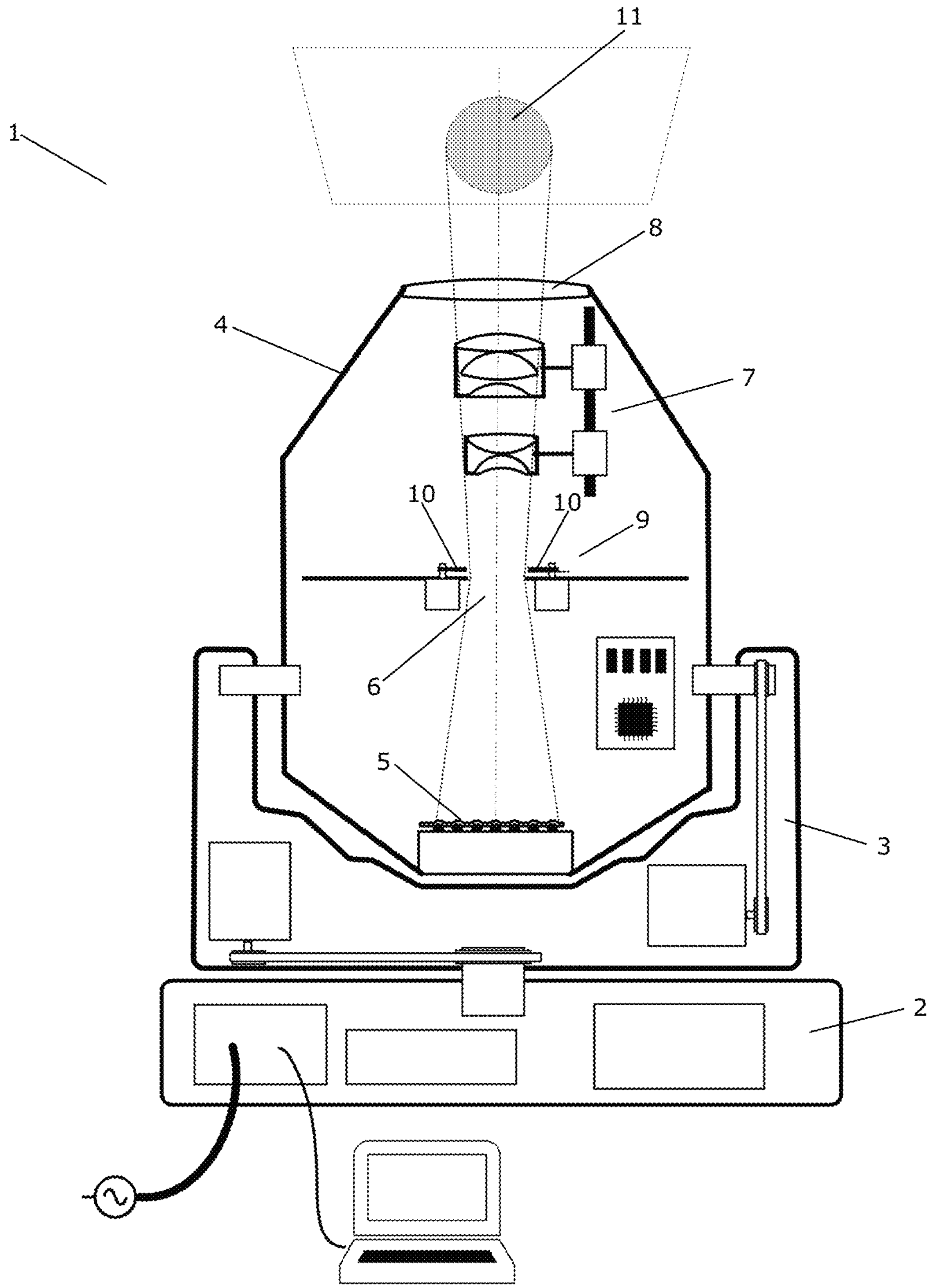
Fig. 1 Prior art
FIG. 1 is a cross sectional view of a prior art lighting fixture.

FIG. 1 is a cross sectional view of a prior art lighting fixture 1. The lighting fixture 1 comprises a base 2, a yoke 3 and a head 4. The head 4 includes a light source 5, in the form of a plurality of LEDs, a gate 6, a zoom and focus system 7 and an exit lens 8. Light generated by the light source 5 passes through the gate 6 and the zoom and focus system 7, and exits the head 4 via the exit lens 8, thereby defining an optical path through the head 4.

The head 4 further includes a framing system 9 arranged at the gate 6, the framing system 9 comprising movable blades 10 which can be moved partly into and out of the light beam in order to define a light passage. The exiting light beam forms an optical projection 11 which is defined by the positions of the movable blades 10 and by the zoom and focus system 7.

Figure 2:
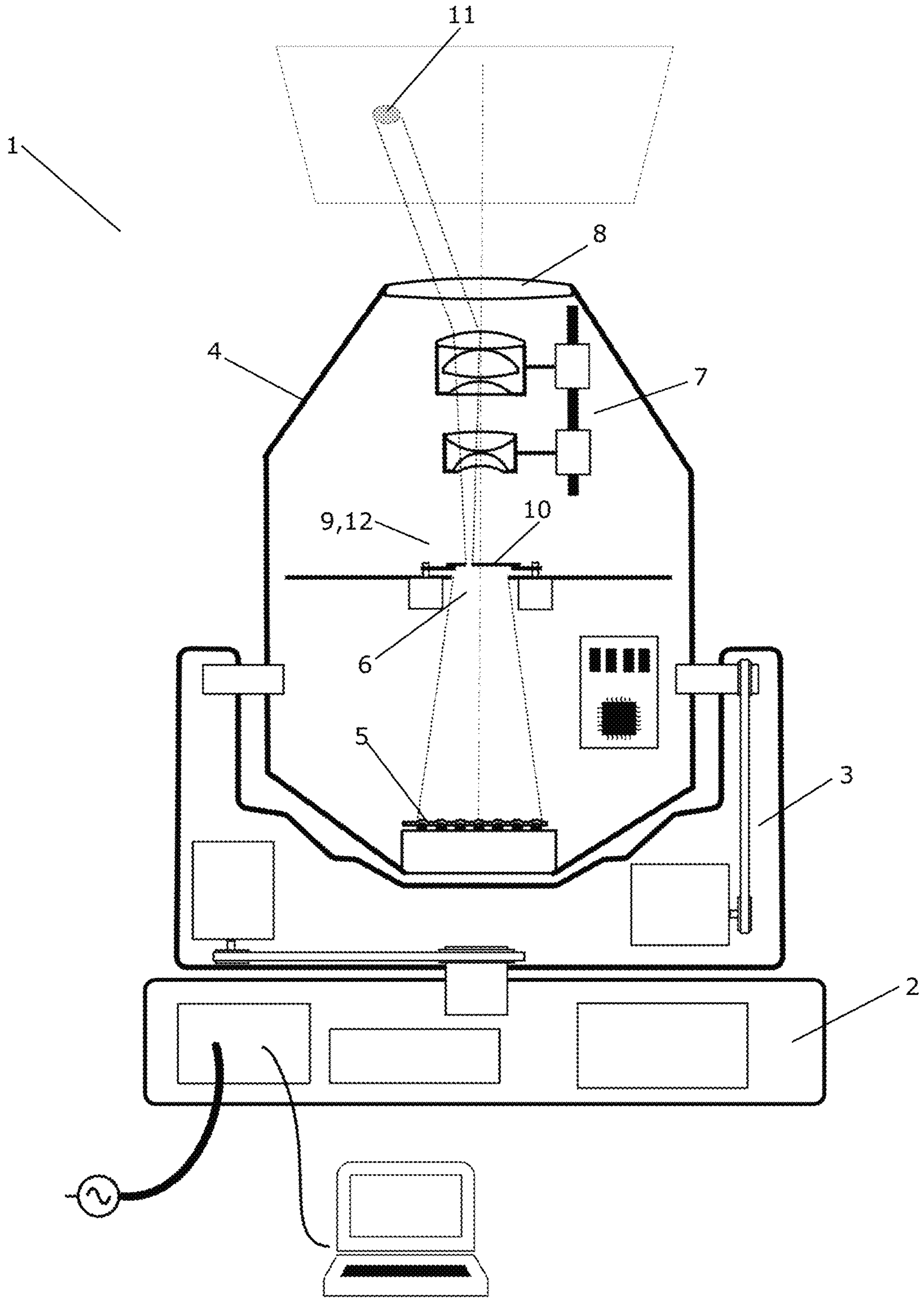
FIGS. 2 and 3 are cross sectional views of a lighting fixture according to a first embodiment of the disclosure.
Figure 3:
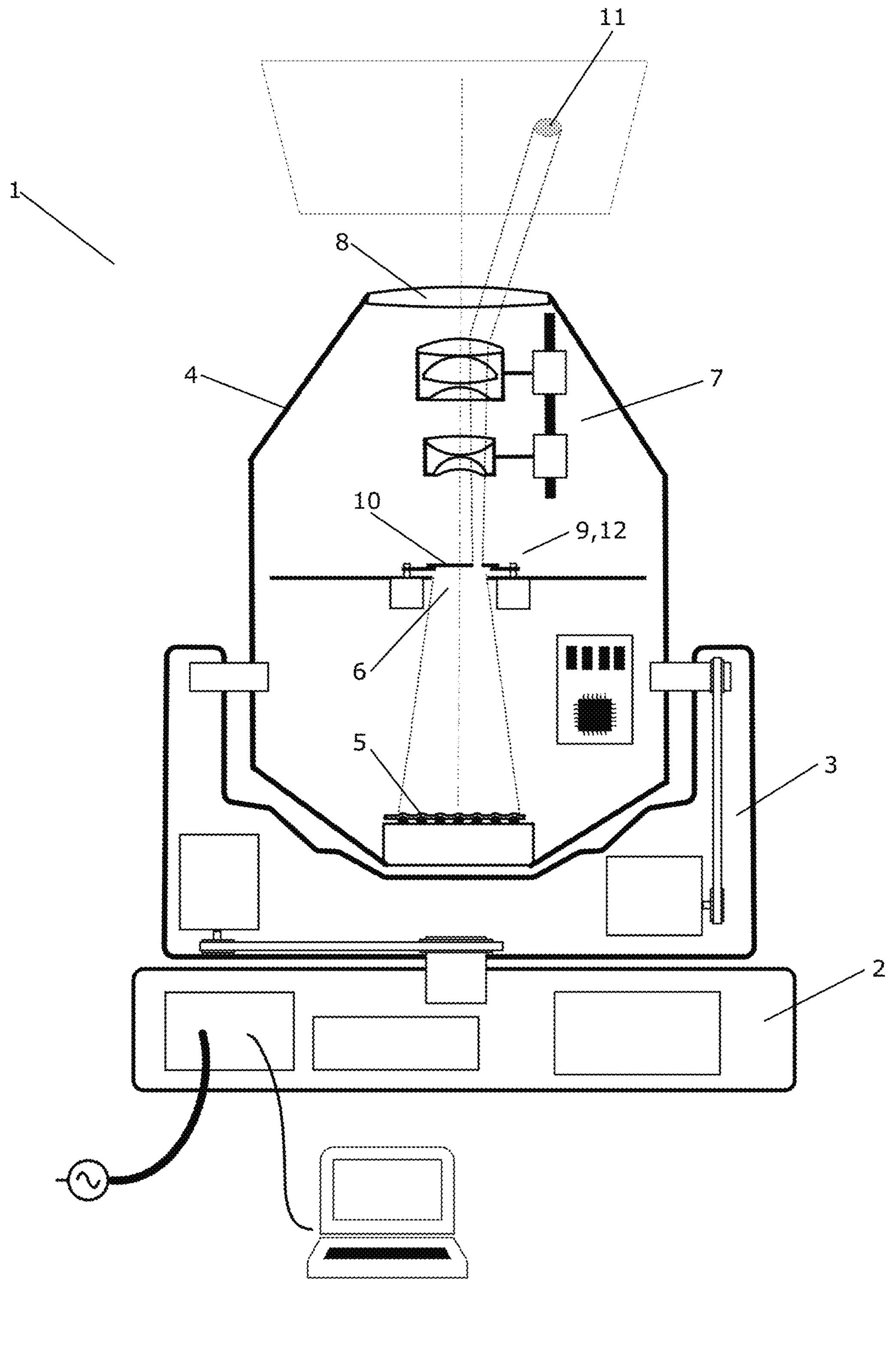

FIGS. 2 and 3 are cross sectional views of a lighting fixture 1 according to a first embodiment of the disclosure. The lighting fixture 1 of FIGS. 2 and 3 is similar to the lighting fixture 1 of FIG. 1, and it will therefore not be described in detail here.

However, the lighting fixture 1 of FIGS. 2 and 3 comprises an XY beam manipulating system 12 forming part of the framing system 9. The XY beam manipulating system 12 comprises a movable blade 10 defining a light passage. Thereby only a small portion of the light generated by the light source 5 passes through the XY beam manipulating system 12. This results in an optical projection 11 being smaller than the optical projection 11 illustrated in FIG. 1.

The XY beam manipulating system 12 can move the movable blade 10 essentially freely in XY directions, i.e. within a plane being substantially transverse to the optical path through the lighting fixture 1. This causes the light passage defined in the movable blade 10 to perform corresponding movements in the XY directions, and this in turn causes the optical projection 11 to move. Thus, by moving the movable blade 10 in accordance with a certain movement pattern will cause the optical projection 11 to move in accordance with a corresponding movement pattern. If the movements of the movable blade 10 are performed sufficiently fast, the resulting optical projection will appear as a stationary figure with the shape of the movement pattern, rather than as a moving optical projection 11.

FIGS. 2 and 3 show the movable blade 10 of the XY beam manipulating system 12 in two different positions, and thereby with the optical projection 11 in two different positions. The XY beam manipulating system 12 will be described in further detail below with reference to FIGS. 4-7.

Figure 4:
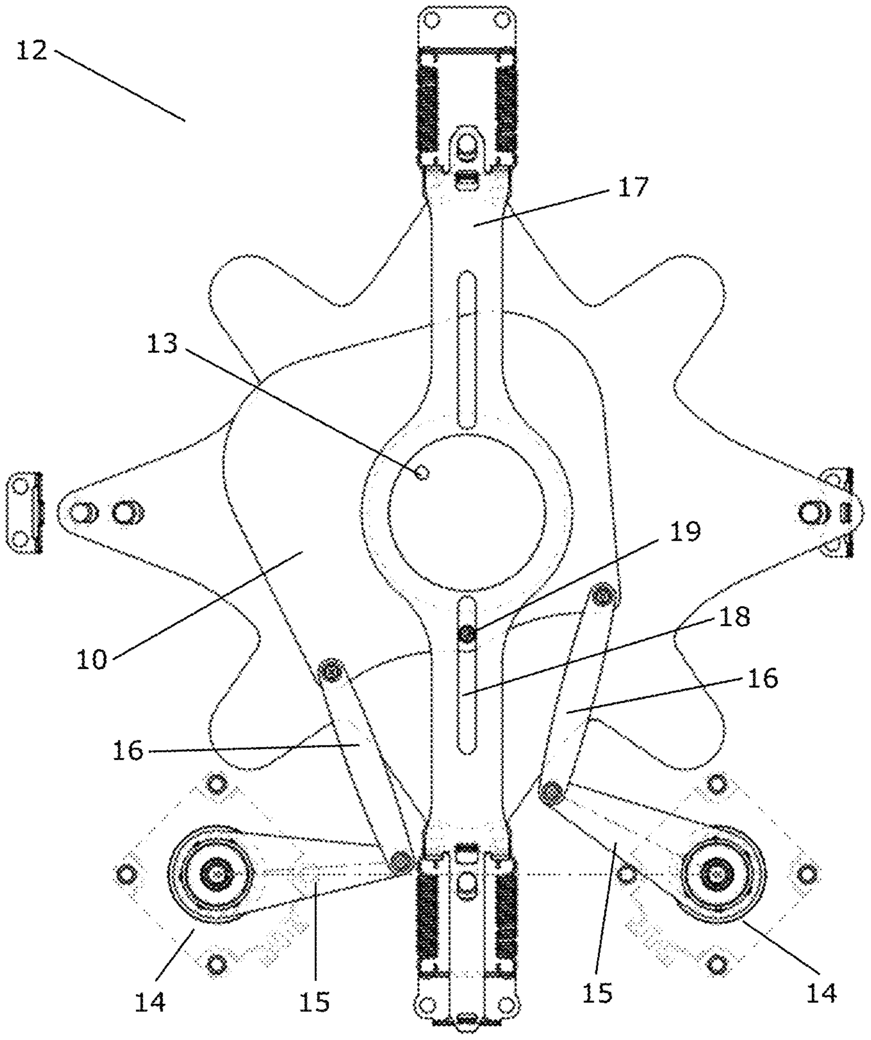
FIG. 4 illustrates an XY beam manipulating system for use in the lighting fixture of FIGS. 2 and 3, FIGS. 5*a*-5*c* show the XY beam manipulating system of FIG. 4 in three different positions.

FIG. 4 illustrates one embodiment of an XY beam manipulating system 12 for use in the lighting fixture 1 of FIGS. 2 and 3. The XY beam manipulating system 12 comprises a movable blade 10 defining a light passage 13 in the form of a small through-going hole.

The movable blade 10 is connected to two actuators 14 via respective motorised bars 15 and passive bars 16. Thereby the movable blade 10 forms an intermediate bar in a five-bar linkage, and the movable blade 10 can be moved by appropriately operating the actuators 14.

The XY beam manipulating system 12 further comprises a blade guide 17 comprising a slot 18, and the movable blade 10 comprises a pin 19 which extends through the slot 18. Thereby the movements of the movable blade 10 are restricted to movements which cause the pin 19 to move linearly along the slot 18. Accordingly, the slot 18 and the pin 19 removes one degree of freedom, thereby ensuring that a given combination of the positions of the actuators 14 can only result in one position of the movable blade 10. Thereby it is avoided that the system is underdetermined. This allows for accurate movements of the movable blade 10, and thereby of the light passage 13.

Figure 5A:
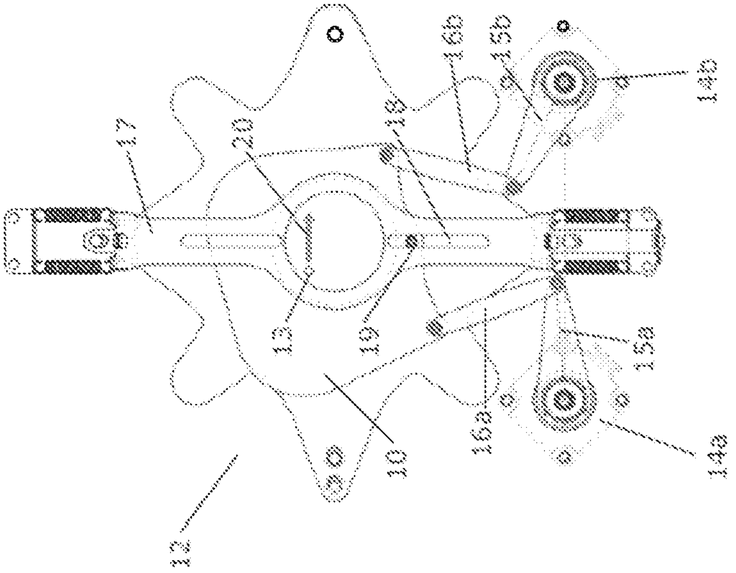
Figure 5B:
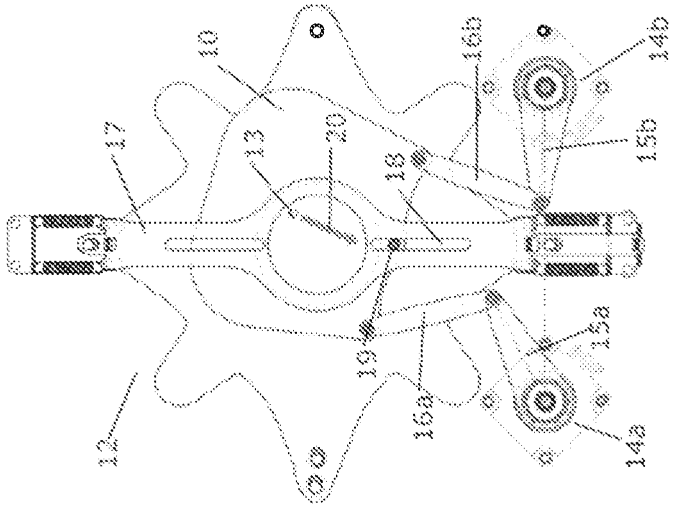
Figure 5C:
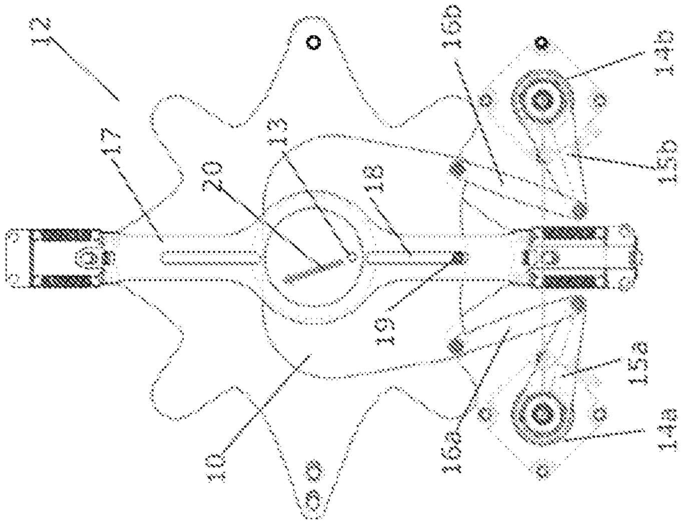

FIGS. 5*a*-5*c* show the XY beam manipulating system 12 of FIG. 4 with the movable blade 10 in three different positions. From the position illustrated in FIG. 5*a*, it is desired to move the light passage 13 towards the right, as illustrated by arrow 20. In order to obtain this, actuator 14*a* needs to be rotated in a counter-clockwise direction, while actuator 14*b* is also rotated in a counter-clockwise direction. This will cause motorised bar 15*a* to move upwards in the drawing, while motorised bar 15*b* moves downwards. The passive bars 16*a*, 16*b* and the restriction provided by the slot 18 and the pin 19 will then cause the movable blade 10 to perform a movement which results in the desired movement of the light passage 13.

In FIG. 5*b*, the movement described above has been completed. It is now desired to move the light passage 13 downwards and towards the left, as illustrated by arrow 20. In order to obtain this, actuator 14*a* needs to be rotated in a clockwise direction, while actuator 14*b* is rotated slightly in a counter-clockwise direction. This will cause motorised bar 15*a* to move downwards in the drawing, while motorised bar 15*b* moves slightly downwards, thereby resulting in the desired movement of the movable blade 10 and the light passage 13, due to the passive bars 16*a*, 16*b*, the slot 18 and the pin 19.

In FIG. 5*c*, the movement described above has been completed. It is now desired to move the light passage 13 upwards and towards the left, as illustrated by arrow 20, i.e. towards the position illustrated in FIG. 5*a*. In order to obtain this, actuator 14*a* needs to be rotated slightly in a counter-clockwise direction, while actuator 14*b* is rotated in a clockwise direction. This will cause motorised bar 15*a* to move slightly in an upwards direction in the drawing, while motorised bar 15*b* also moves upwards, thereby resulting in the desired movement of the movable blade 10 and the light passage 13.

By sequentially operating the actuators 14*a*, 14*b* in the manner described above, and thereby sequentially moving the light passage 13 between the respective positions illustrated in FIGS. 5*a*, 5*b* and 5*c*, the light passage 13 is moved in accordance with a triangular movement pattern. This will, in turn, cause the optical projection defined by the light passage 13 to follow a corresponding triangular movement pattern. Since the weight of the motorised bars 15*a*, 15*b*, the passive bars 16*a*, 16*b* and the movable blade 10 is relatively low, it is possible to perform the movements described above in a fast manner, e.g. repeating the triangular movement pattern with a frequency of at least 3 Hz, such as at least 5 Hz, at least 10 Hz, at least 15 Hz, or even at least 20 Hz. This will create an illusion of an optical projection in the form of a stationary triangular object, rather than a small optical projection following a triangular movement pattern.

Figure 6:
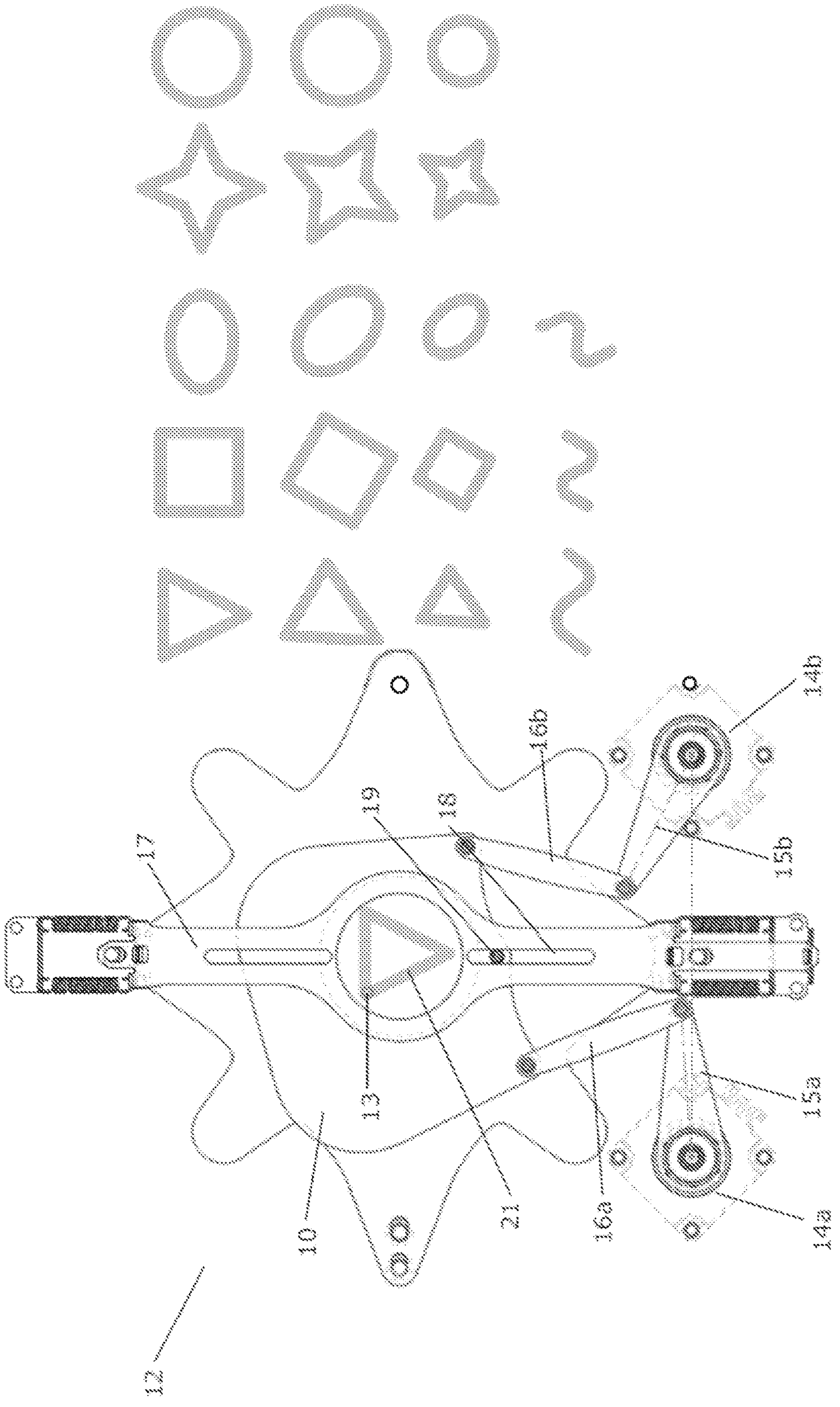
FIG. 6 shows the beam manipulating system of FIG. 4 and a selection of movement patterns.

FIG. 6 shows the XY beam manipulating system 12 of FIGS. 4 and 5*a*-5*c*, with the triangular movement pattern 21 illustrated. Furthermore, a number of alternative movement patterns are shown, which could be obtained by appropriately operating the actuators 14*a*, 14*b*.

Figures 7A, 7B:
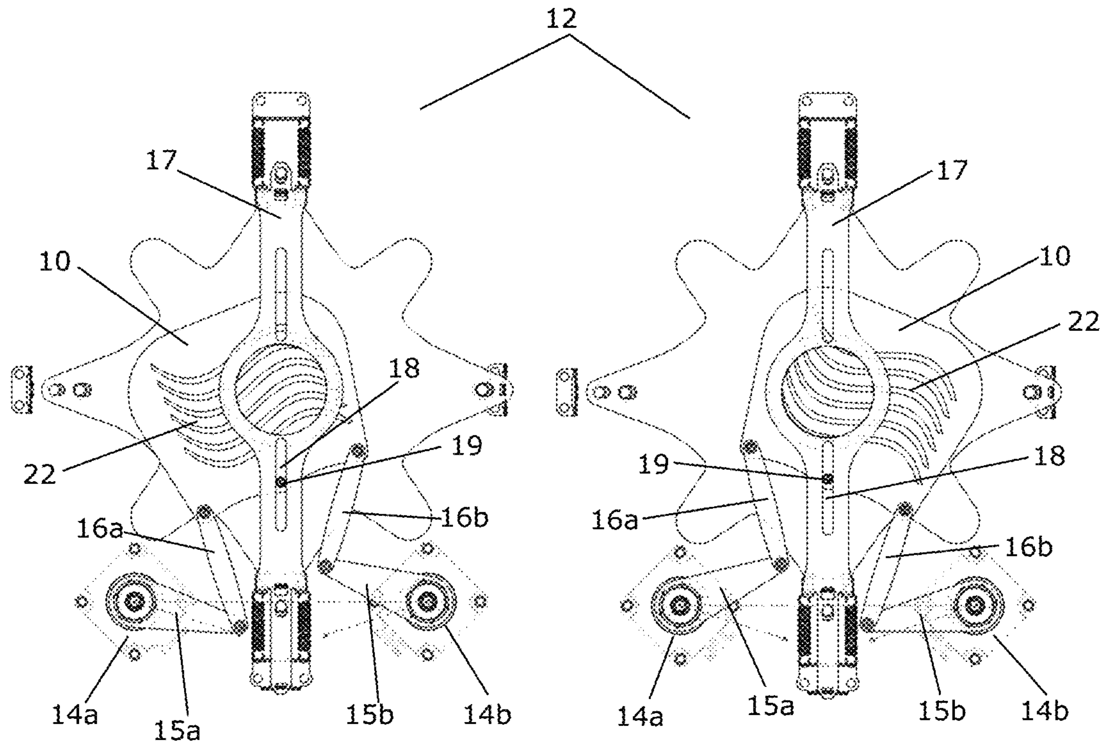
FIGS. 7*a* and 7*b* illustrate an alternative XY beam manipulating system for use in the lighting fixture of FIGS. 2 and 3, FIGS. 8-11 are cross sectional views of a lighting fixture according to a second embodiment of the disclosure.
Figure 8:
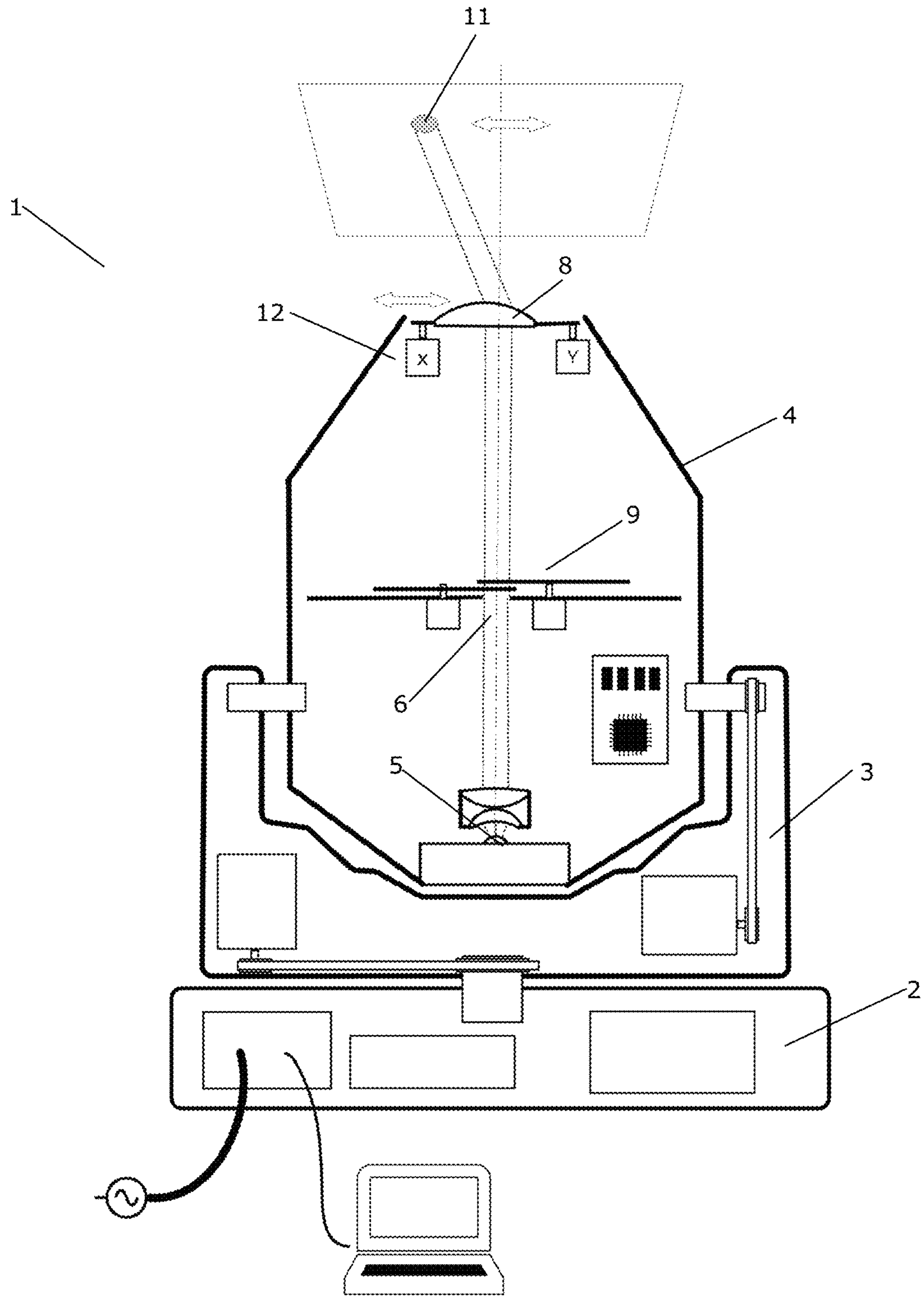
Figure 9:
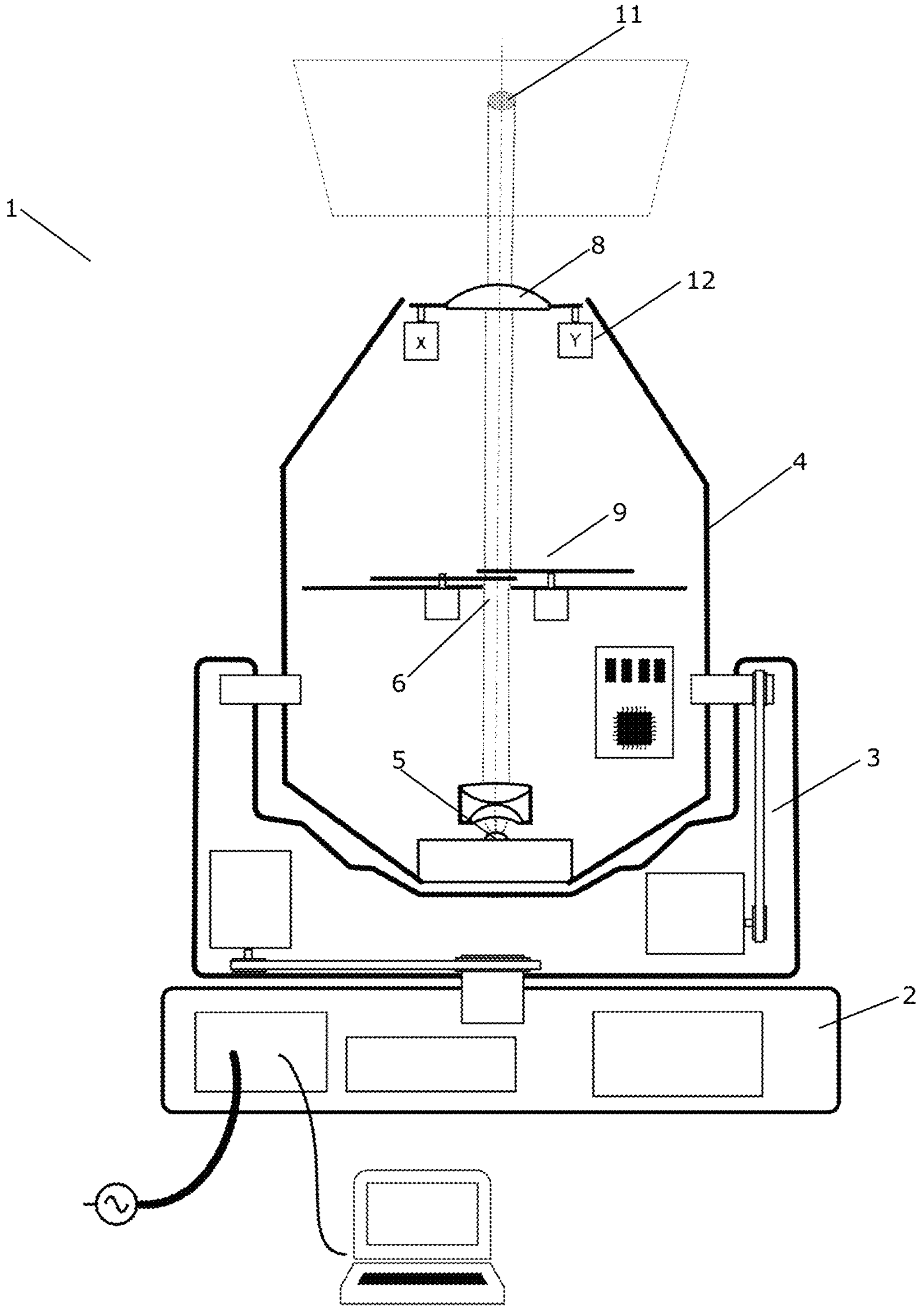
Figure 10:
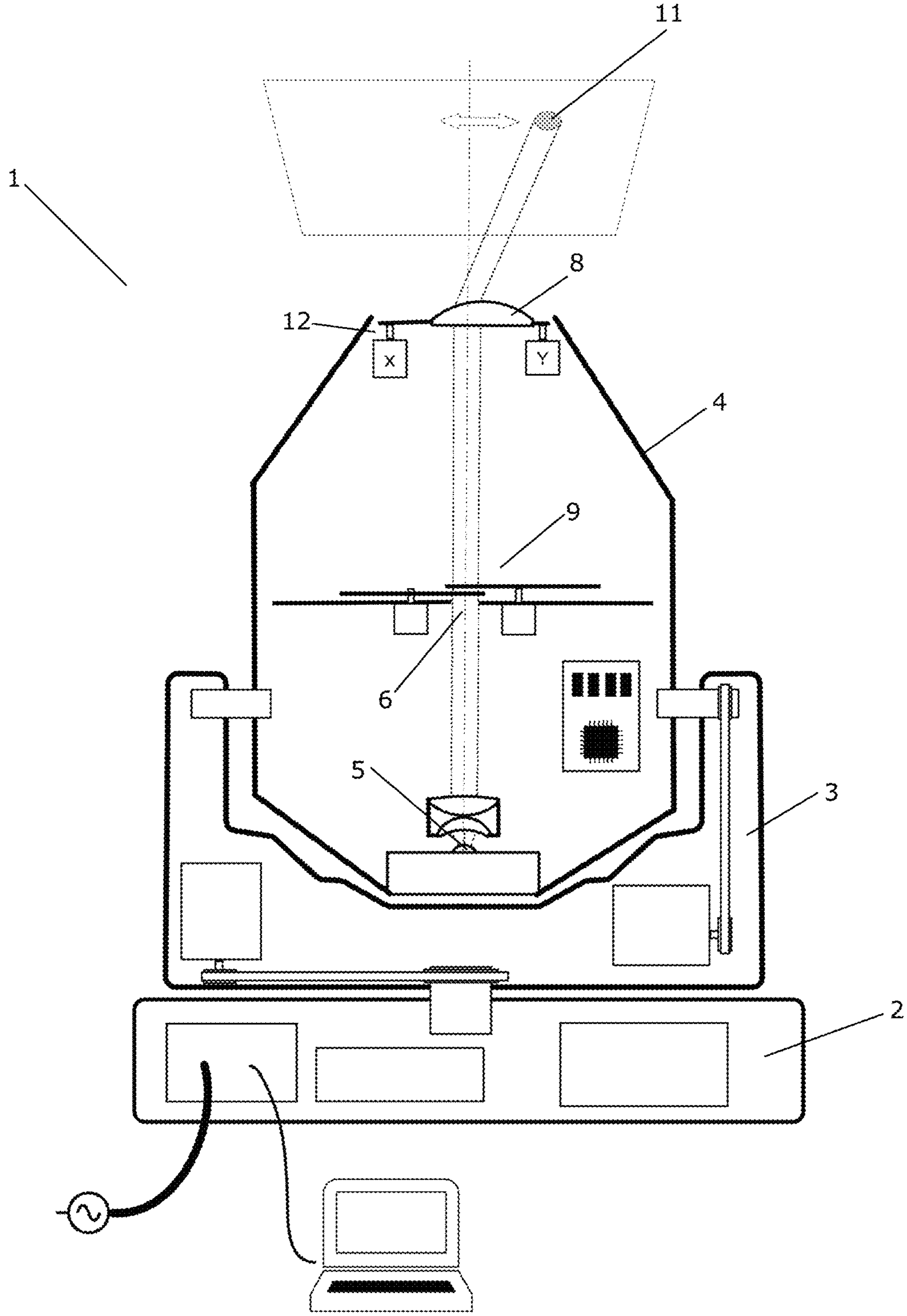
Figure 11:
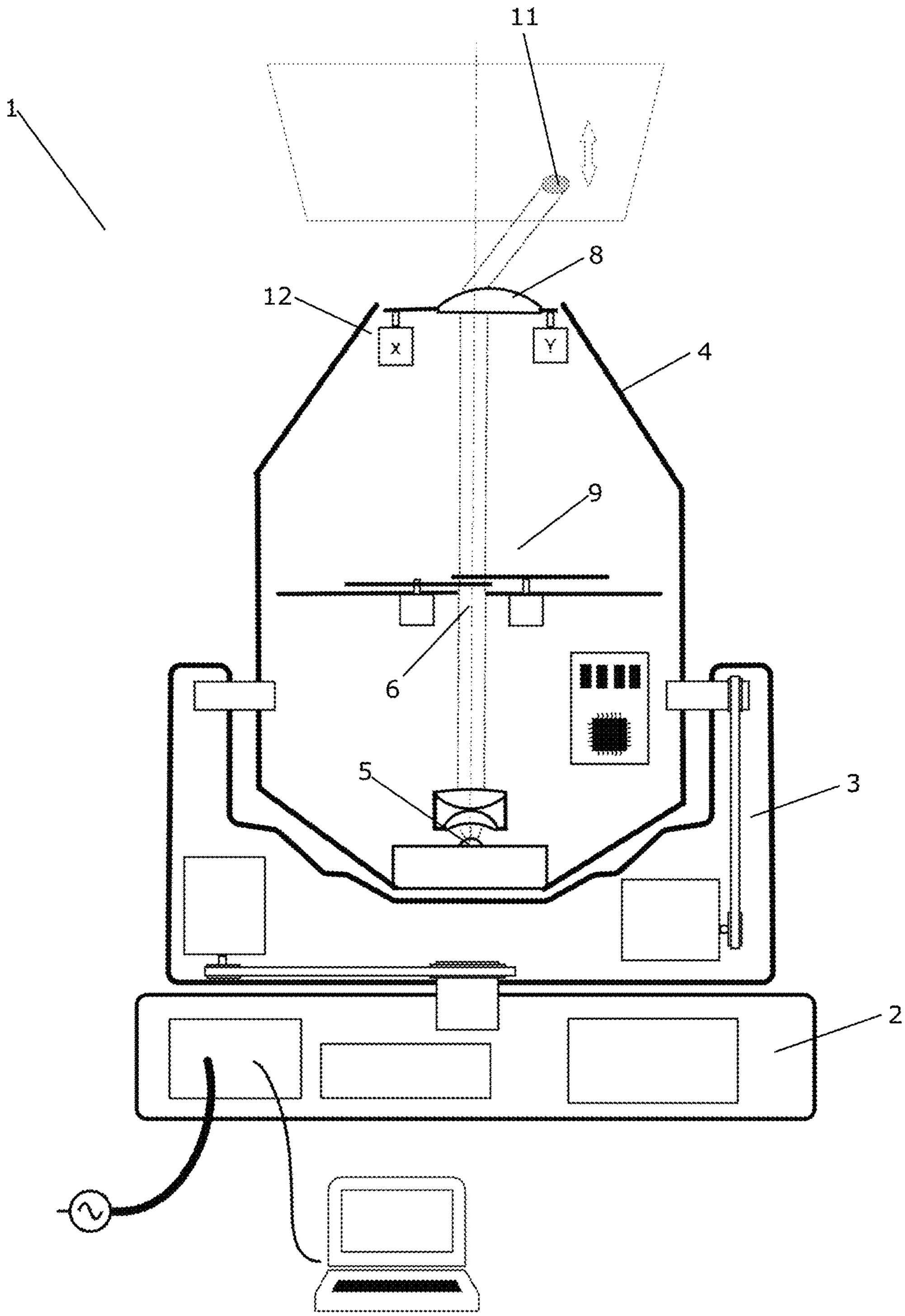

FIGS. 7*a* and 7*b* show an alternative XY beam manipulating system 12 for use in the lighting fixture 1 of FIGS. 2 and 3. The XY beam manipulating system 12 of FIGS. 7*a* and 7*b* is very similar to the XY beam manipulating system of FIGS. 4 and 5*a*-5*c*, and it will therefore not be described in detail here. However, in the XY beam manipulating system 12 of FIGS. 7*a* and 7*b*, a light passage pattern 22, rather than a simple light passage, is defined in the movable blade 10. Accordingly, the optical projection being moved when moving the movable blade 10 has the shape of the light passage pattern 22, rather than the shape of a simple spot.

FIGS. 7*a* and 7*b* show the movable blade 10 in two different positions.

FIGS. 8-11 are cross sectional views of a lighting fixture 1 according to a second embodiment of the disclosure. The lighting fixture 1 of FIGS. 8-11 is very similar to the lighting fixture 1 of FIGS. 2 and 3, and it will therefore not be described in detail here.

However, in the lighting fixture 1 of FIGS. 8-11, the XY beam manipulating system 12 is connected to the exit lens 8, rather than forming part of the framing system 9. Thus, in the lighting fixture 1 of FIGS. 8-11, the optical projection 11 is moved by moving the exit lens 8 within an XY plane by means of the XY beam manipulating system 12. FIGS. 8-11 show the exit lens 8, and thereby the optical projection 11, in four different positions, which can be reached by appropriately operating the XY beam manipulating system 12.

Figure 12:
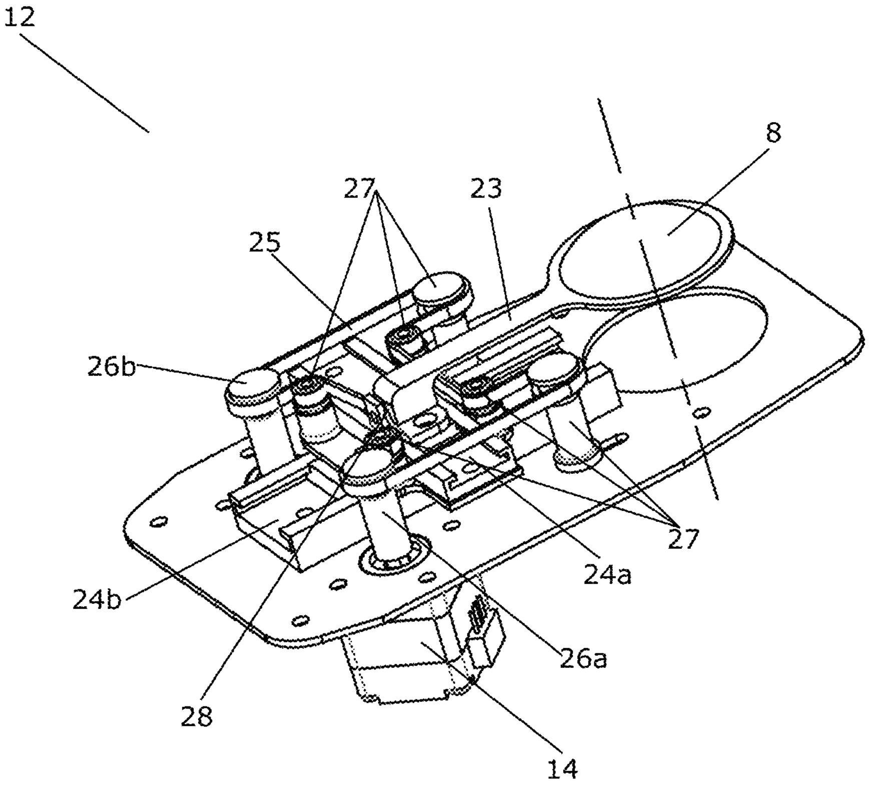
FIG. 12 is a perspective view of an XY beam manipulating system for use in the lighting fixture of FIGS. 8-11, FIGS. 13*a*-13*d* show the XY beam manipulating system of FIG. 12 in four different positions.

FIG. 12 is a perspective view of an alternative embodiment of an XY beam manipulating system 12 for use in the lighting fixture 1 of FIGS. 8-11. An exit lens 8 is connected directly to the XY beam manipulating system 12, in such a manner that an arm 23 holding the exit lens 8 can move along a first slide 24*a*, and the first slide 24*a* can move along a second slide 24*b*. The first slide 24*a* and the second slide 24*b* thereby define two directions of movement, which are perpendicular to each other, thereby defining XY movements of the arm 23, and thereby the exit lens 8, within a plane and with two degrees of freedom.

A driving belt 25 interconnects two driving pulleys 26*a*, 26*b* and six passive pulleys 27, and is connected to the arm 23 at connecting point 28. Two actuators 14, one of which is shown, are connected to the respective driving pulleys 26*a*, 26*b*. Thereby, operating one of the actuators 14 causes the corresponding driving pulley 26*a*, 26*b* to rotate, thereby affecting the driving belt 25. Coordinated operation of the two actuators 14 will thereby cause a desired movement of the exit lens 8. This will be explained in further detail below with reference to FIGS. 13*a*-13*d*.

Figure 13A:
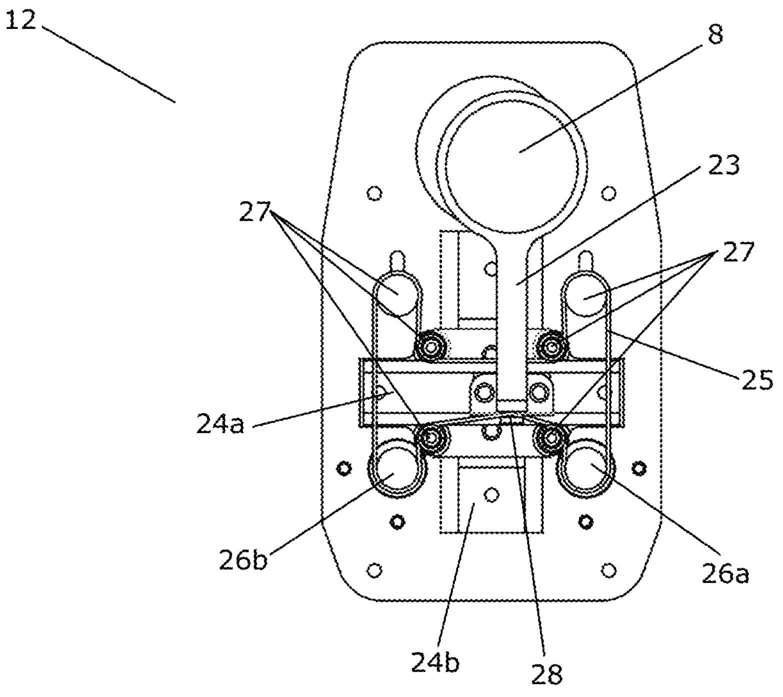
Figure 13B:
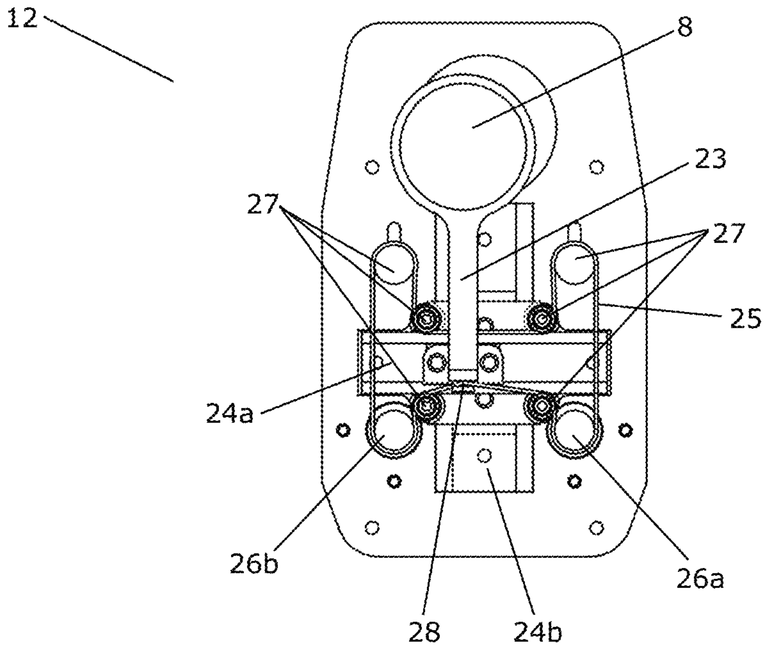

FIGS. 13*a*-13*b* show the XY beam manipulating system 12 of FIG. 12 with the exit lens 8 in four different positions. In order to move the exit lens 8 from the position illustrated in FIG. 13*a* to the position illustrated in FIG. 13*b*, both of the driving pulleys 26*a*, 26*b* should be rotated in a counter-clockwise direction, at approximately the same speed. This will cause the driving belt 25 to pull the arm 23 towards the left, along the first slide 24*a*, without moving the first slide 24*a* along the second slide 24*b*, thereby moving the exit lens 8 directly towards the left.

Similarly, rotating both of the driving pulleys 26*a*, 26*b* in a clockwise direction, at approximately the same speed, will cause the exit lens 8 to move directly towards the right, e.g. from the position illustrated in FIG. 13*b* to the position illustrated in FIG. 13*a*.

Figure 13C:
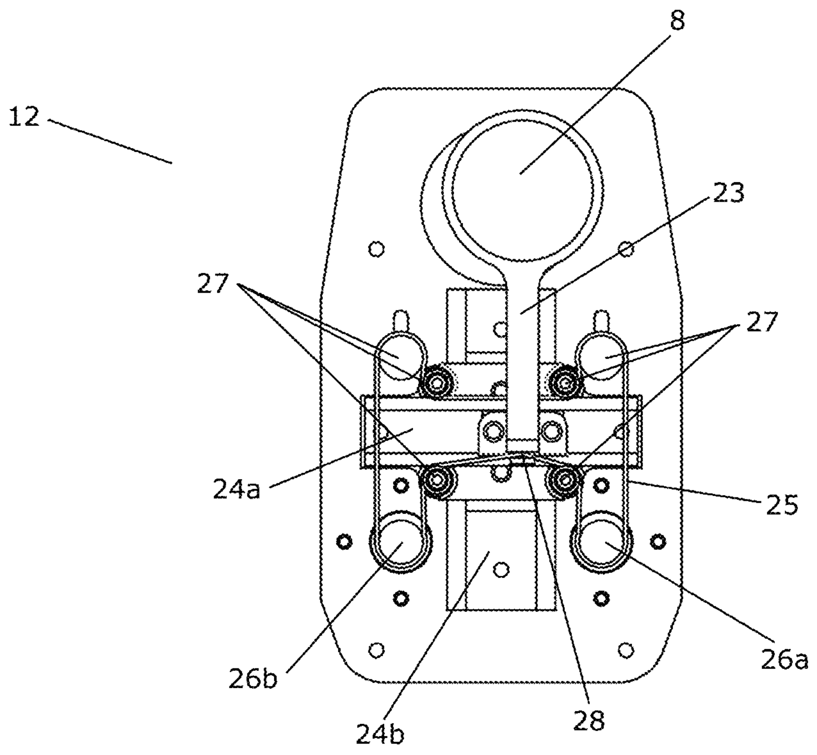
Figure 13D:
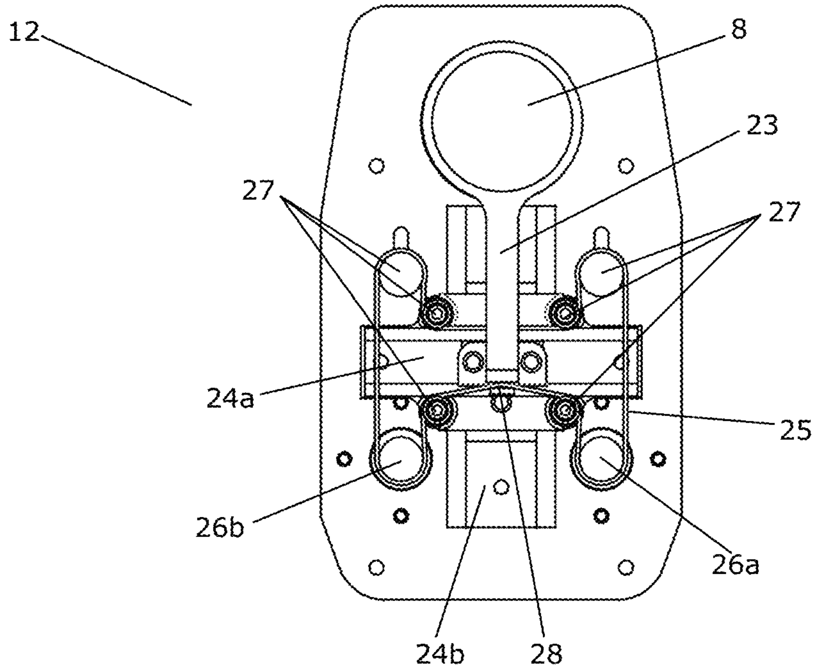

In order to move the exit lens 8 from the position illustrated FIG. 13*a* to the position illustrated in FIG. 13*c*, driving pulley 26*a* should be rotated in a clockwise direction, while driving pulley 26*b* is rotated in a counter-clockwise direction, at approximately the same speed. This will cause a pull in the driving belt 25 which causes the first slide 24*a* to move upwards along the second slide 24*b*, without moving the arm 23 along the first slide 24*a*, thereby moving the exit lens 8 directly in an upwards direction.

Similarly, rotating driving pulley 26*a* in a counter-clockwise direction, while rotating driving pulley 26*b* in a clockwise direction, at approximately the same speed, will cause the exit lens 8 to move directly in a downwards direction, e.g. from the position illustrated in FIG. 13*c* to the position illustrated in FIG. 13*a*.

In summary, rotating both of the driving pulleys 26*a*, 26*b* in the same direction at approximately the same speed, will cause the exit lens 8 to move in a left-right direction, and rotating the driving pulleys 26*a*, 26*b* in opposite direction at approximately the same speed, will cause the exit lens 8 to move in an up-down direction. Furthermore, appropriately operating the driving pulleys 26*a*, 26*b* in a coordinated manner will cause the exit lens 8 to move in a direction which includes left-right movement as well as up-down movement. Accordingly, by appropriately selecting direction as well as speed of the rotation of each of the driving pulleys 26*a*, 26*b* in a coordinated and appropriate manner, the exit lens 8 can be moved along any desired direction within the plane defined by the slides 24*a*, 24*b*. Thereby the exit lens 8 can be moved in accordance with a selected movement pattern.

Figure 14:
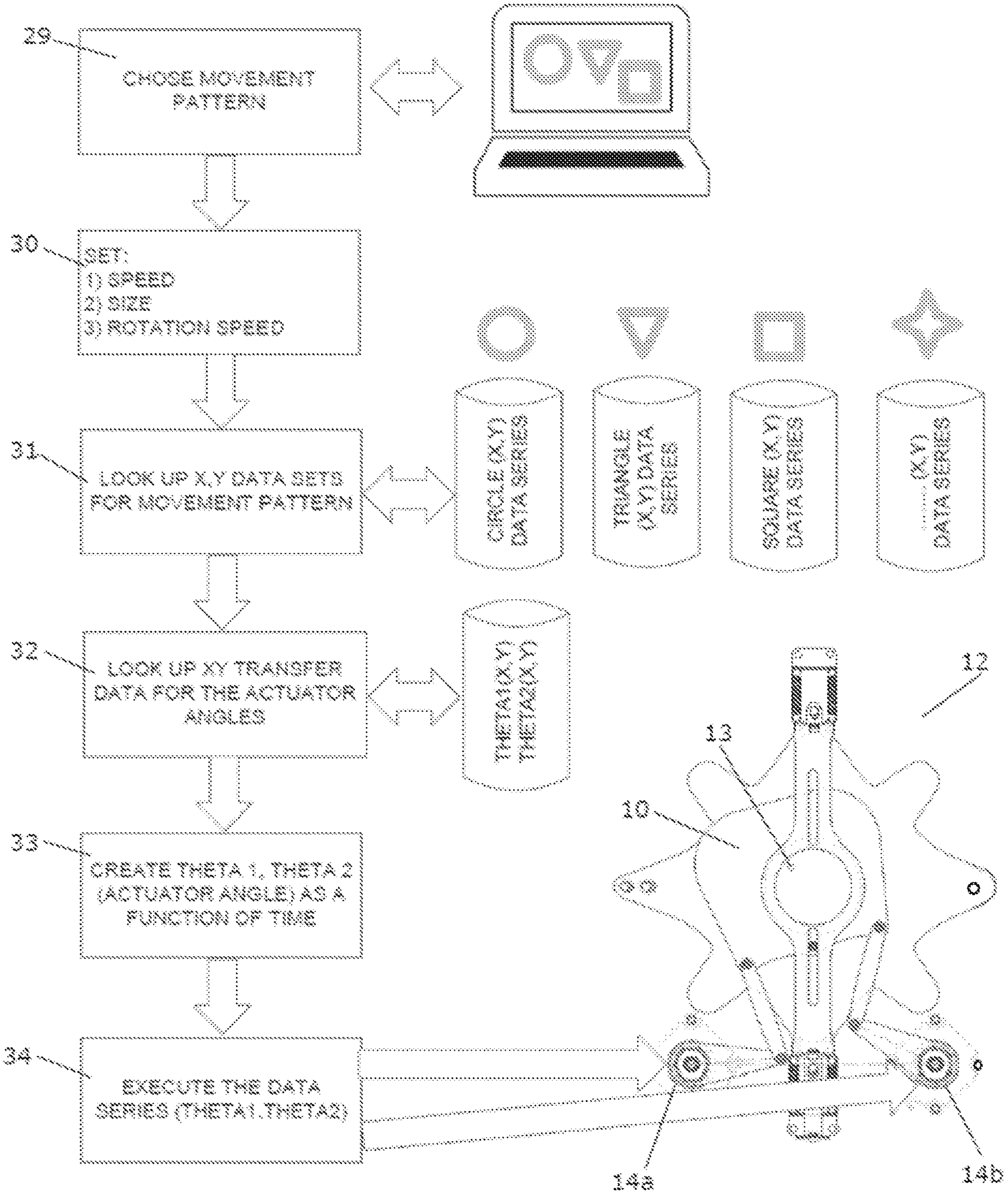
FIG. 14 illustrates a method according to an embodiment of the disclosure.

FIG. 14 illustrates a method according to an embodiment of the disclosure. The method illustrated in FIG. 14 is applied for controlling an XY beam manipulating system 12 of the kind illustrated in FIGS. 4, 5*a*-5*c*, 6 and 7*a*-7*b*. It should, however, be noted that the method may also be applied for controlling an XY beam manipulating system 12 of the kind illustrated in FIGS. 12 and 13*a*-13*d*, or in any other kind of XY beam manipulating system 12 falling within the scope of present disclosure.

At step 29 a desired movement pattern for an optical projection is selected, and at step 30 speed size and rotation speed of the movement pattern is selected.

At step 31 an XY data set corresponding to the selected movement pattern is obtained by consulting a database comprising previously calculated XY data sets for a number of predefined movement patterns.

At step 32 a transfer function is obtained between the XY data set and input parameters for the XY beam manipulating system 12, and thereby between the selected movement pattern and the input parameters for the XY beam manipulating system 12. The input parameters are in the form of angular positions of the actuators 14*a*, 14*b* of the XY beam manipulating system 12, which will position the light passage 13 in the respective XY positions defining the selected movement pattern At step 33 a time series of actuator angles for the actuators 14*a*, 14*b* is created, which causes the light passage 13 to sequentially follow the XY positions defining the selected movement pattern.

Finally, at step 34 the time series created at step 33 is executed, thereby causing the actuators 14*a*, 14*b* be rotate in accordance with the time series of actuator angles. This causes the movable blade 10 to move in such a manner that the light passage 13 follows the selected movement pattern.

From the above said some general conclusions can be drawn as will be discussed below.

The lighting fixture may, e.g., comprise a base, a yoke and a head. In this case the light source, the exit lens and the XY beam manipulating system may form part of the head.

The optical axis of the lighting fixture may remain essentially unaltered by the XY beam manipulating system. According to this embodiment, the optical axis of the lighting fixture, and thereby the path which the light travels through the lighting fixture, remains essentially unaltered, and thereby essentially unaffected, by the XY beam manipulating system. Accordingly, the XY beam manipulating system does not affect the direction of the light exiting the lighting fixture. This is contrary to prior art laser based systems, where a mirror changes the direction of the light, and thereby alters the optical axis of the lighting fixture.

The lighting fixture may further comprise a zoom and focus system arranged between the light source and the exit lens, and the XY beam manipulating system may be arranged between the light source and the zoom and focus system.

According to this embodiment, light emitted from the light source passes through the XY beam manipulating system before it reaches the exit lens. Thus, the XY beam manipulating system may be arranged in an interior part of the lighting fixture. More particularly, the XY beam manipulating system is arranged between the light source and a zoom and focus system. In the present context the term 'zoom and focus system' should be interpreted to mean a system forming part of the lighting fixture which is applied for zooming and/or focusing the light which exits the lighting fixture. The zoom and focus system may comprise one or more suitable lenses.

Thus, according to this embodiment, the light which reaches the zoom and focus system has already been manipulated by the XY beam manipulating system, and thereby it is the manipulated beam which is zoomed and focused by the zoom and focus system. This provides a sharp result for the projected light beam.

For instance, the XY beam manipulating system may be or form part of a framing system arranged inside the lighting fixture at or near an optical focal point.

By arranging the XY beam manipulating system at or near an optical focal point, it is ensured that the image created by the XY beam manipulating system is sharp and in focus. Thereby the resulting optical projection is also sharp and in focus.

By designing the XY beam manipulating system as a part of a framing system, the XY beam manipulating system forms part of a component which is already present in such lighting fixtures, and thereby minimal design changes are required in order to accommodate the XY beam manipulating system inside existing lighting fixture designs. This may even allow for retrofitting existing lighting fixtures with this feature.

The framing system may comprise at least one movable blade defining a light passage or a light passage pattern, and the XY beam manipulating system may be configured to move the movable blade within a plane and with two degrees of freedom.

According to this embodiment, only light corresponding to the light passage or light passage pattern defined by the movable blade is allowed to pass the XY beam manipulating system. Thus, the light passage or light passage pattern determines the shape and the position of the light which is allowed to pass the XY beam manipulating system.

Furthermore, the position of the light which is allowed to pass the XY beam manipulating system is determined by the movements of the movable blade within the plane. Since the movable blade is configured to move with two degrees of freedom, it is possible to allow the light passing through the light passage or light passage pattern to follow a wide selection of possible movement patterns, simply by manipulating the movable blade to move in a corresponding movement pattern.

According to this embodiment, it may be possible to move the optical projection very fast, since the mass of such a movable blade may be small.

The framing system may further comprise at least one blade guide comprising a slot, and the at least one blade may comprise a pin extending from the blade and through the slot of the blade guide, the blade guide thereby restricting movements of the blade.

According to this embodiment, the movements of the movable blade are restricted to movements defined by the engagement between the slot and the pin. However, this also ensures that the movements of the movable blade are well defined, and that, e.g., rotating movements can be performed in a simple manner.

The at least one movable blade may constitute an intermediate bar in a five-bar linkage between two sets of outer bars, each set of outer bars comprising a motorised bar and a passive bar.

According to this embodiment, the movements of the movable blade, within the plane and with two degrees of freedom, are brought about by appropriately manipulating the motorised bars, and transferring movements of the motorised bars to the movable blade, via the passive bars. Such an arrangement is easy to manipulate, and the selection of possible movement patterns is wide, thus providing high flexibility in an easy manner and with low costs.

The framing system may further comprise two or more actuators, each actuator being operatively attached to one of the motorised bars. According to this embodiment, the motorised bars are manipulated by means of respective actuators. Each actuator may, e.g., comprise a motor, such as an electrical motor, being operatively connected to the corresponding motorised bar.

As an alternative to defining a light passage or a light passage pattern in a movable blade, a light passage, e.g. in the form of an aperture, may be formed by appropriately positioning two or more movable blades relative to each other. The two or more movable blades may then be moved in unison or in a coordinated manner, thereby moving the formed light passage or aperture, essentially in the manner described above. In this case the movable blades may form part of a framing system which is already present in the lighting fixture, and thereby the capability of creating optical projection effects may be obtained without introducing additional components in the lighting fixture.

As an alternative to positioning the XY beam manipulating system in the interior part of the lighting fixture, such as between the light source and a zoom and focus system, the XY beam manipulating system may be connected to or form part of the exit lens.

According to this embodiment, the exit lens is moved in order to provide the XY beam manipulation which creates the optical projection effects, rather than moving a component or a system arranged inside the lighting fixture. One advantage of this embodiment is that the loss of light in the XY beam manipulating system is minimised. For instance, the light source may be very small, e.g. only a single LED, and the entire light beam may be manipulated by the XY beam manipulating system being connected to or forming part of the exit lens.

The XY beam manipulating system may comprise an XY table connected to the exit lens, the XY table being configured to cause the exit lens to perform XY movements within a plane and with two degrees of freedom.

This is an easy manner of providing XY manipulation at the exit lens.

The XY beam manipulating system may be configured to repeat a selected movement pattern with a frequency of at least 3 Hz, such as at least 5 Hz, at least 10 Hz, at least 15 Hz, or even at least 20 Hz. When a movement pattern is repeated at such frequencies, the human eye will perceive the created optical projection as a fixed object with an outline corresponding to the movement pattern, rather than as a moving object following the outline of the movement pattern. Accordingly, an illusion of a fixed projected figure is created with simple and cost effective means.

As far as the method is concerned, the following can be deduced.

The step of obtaining at least one transfer function may comprise obtaining XY data sets for the selected movement pattern and generating a transfer function between the XY data sets and input parameters for the XY beam manipulating system.

According to this embodiment, when obtaining the transfer function, XY positions of the XY beam manipulating system, which results in the exiting light beam moving in accordance with the selected movement pattern, are initially identified, thereby obtaining XY data sets for the selected movement pattern. A transfer function is then generated between the XY data sets and input parameters for the XY beam manipulating system, where the input parameters cause the XY beam manipulating system to move in accordance with the XY data sets, and thereby in accordance with the selected movement pattern.

The step of generating input parameters for the XY beam manipulating system may comprise consulting a look-up table.

According to this embodiment, the transfer function may be or include the look-up table. The look-up table may include pre-calculated input parameters for the XY beam manipulating system which causes the XY beam manipulating system to move in such a manner that a light beam passing through the XY beam manipulating system is manipulated to follow a number of selectable movement patterns. Thus, once a movement pattern has been selected, relevant input parameters for the XY beam manipulating system are readily available by means of the look-up table. Thereby only limited processing power is required during operation of the lighting fixture.

This embodiment is particularly relevant in the case that the movement pattern is selected among a number of predefined movement patterns.

The XY beam manipulating system may be or form part of a framing system arranged inside the lighting fixture, the framing system comprising at least one movable blade, and the step of generating input parameters for the XY beam manipulating system may comprise generating actuator angles for one or more actuators being operatively attached to the at least one movable blade.

According to this embodiment, the input parameters specify how to manipulate the one or more actuators in order to cause them to move the at least one movable blade in a manner which causes the exiting light beam to follow the selected movement pattern.

What is claimed is:

1. A lighting fixture comprising:

a light source;

an exit lens; and an XY beam manipulating system, the XY beam manipulating system being arranged along an optical axis of the lighting fixture between the light source and an outer surface of the exit lens, wherein the XY beam manipulating system is configured to perform movements within a plane and with two degrees of freedom, thereby causing an exiting light beam of the lighting fixture to move in accordance with a selected movement pattern.

2. The lighting fixture according to claim 1, wherein the optical axis of the lighting fixture remains essentially unaltered by the XY beam manipulating system.

3. The lighting fixture according to claim 1, wherein the lighting fixture further comprises a zoom and focus system arranged between the light source and the exit lens, and wherein the XY beam manipulating system is arranged between the light source and the zoom and focus system.

4. The lighting fixture according to claim 1, wherein the XY beam manipulating system is or forms part of a framing system arranged inside the lighting fixture at or near an optical focal point.

5. The lighting fixture according to claim 4, wherein the framing system comprises at least one movable blade defining a light passage or a light passage pattern, and wherein the XY beam manipulating system is configured to move the movable blade within a plane and with two degrees of freedom.

6. The lighting fixture according to claim 5, wherein the framing system further comprises at least one blade guide comprising a slot, and wherein the at least one movable blade comprises a pin extending from the at least one movable blade and through the slot of the blade guide, the blade guide thereby restricting movements of the at least one movable blade.

7. The lighting fixture according to claim 5, wherein the at least one movable blade constitutes an intermediate bar in a five-bar linkage between two sets of outer bars, each set of outer bars comprising a motorised bar and a passive bar.

8. The lighting fixture according to claim 7, wherein the framing system further comprises two or more actuators, each actuator being operatively attached to one of the motorised bars.

9. The lighting fixture according to claim 1, wherein the XY beam manipulating system is connected to or forms part of the exit lens.

10. The lighting fixture according to claim 9, wherein the XY beam manipulating system comprises an XY table connected to the exit lens, the XY table being configured to cause the exit lens to perform XY movements within a plane and with two degrees of freedom.

11. The lighting fixture according to claim 1, wherein the XY beam manipulating system is configured to repeat a selected movement pattern with a frequency of at least 3 Hz.

12. A method for controlling a lighting fixture comprising a light source, an exit lens, and an XY beam manipulating system, the method comprising the steps of:

selecting a desired movement pattern for a light beam exiting the exit lens, obtaining at least one transfer function between the selected desired movement pattern and input parameters for the XY beam manipulating system, generating input parameters for the XY beam manipulating system, based on the at least one transfer function, and operating the XY beam manipulating system in accordance with the generated input parameters to perform movements within a plane and with two degrees of freedom.

13. The method according to claim 12, wherein the step of obtaining at least one transfer function comprises obtaining XY data sets for the selected desired movement pattern and generating a transfer function between the XY data sets and input parameters for the XY beam manipulating system.

14. The method according to claim 12, wherein the step of generating input parameters for the XY beam manipulating system comprises consulting a look-up table.

15. The method according to claim 12, wherein the XY beam manipulating system is or forms part of a framing system arranged inside the lighting fixture, the framing system comprising at least one movable blade, and wherein the step of generating input parameters for the XY beam manipulating system comprises generating actuator angles for one or more actuators being operatively attached to the at least one movable blade.

* * * * *